April 8, 1969
J. L. TOCANNE
3,437,924
FLUID ANALYZER PROBE INCLUDING A THIN PLIABLE METAL ELECTRODE
Filed Nov. 30, 1965
Sheet 2 of 2
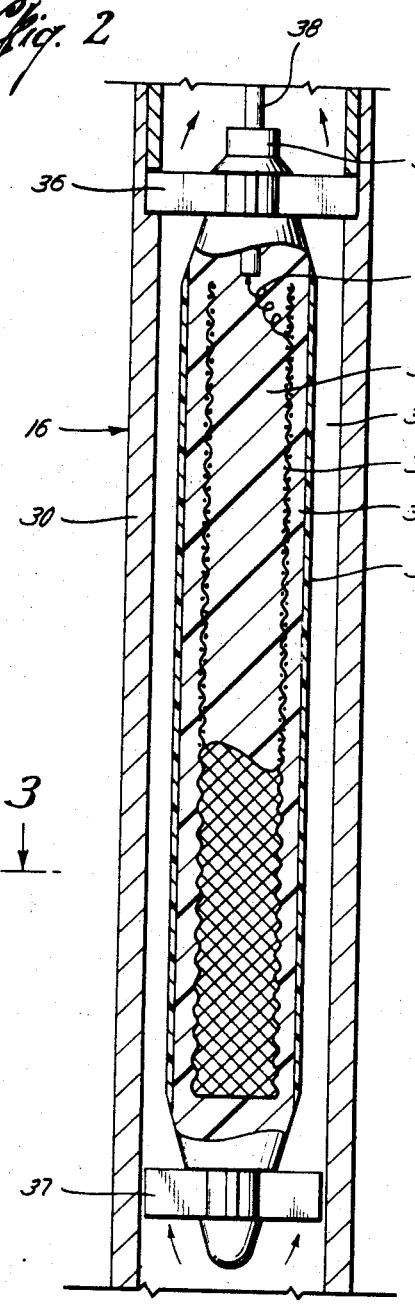
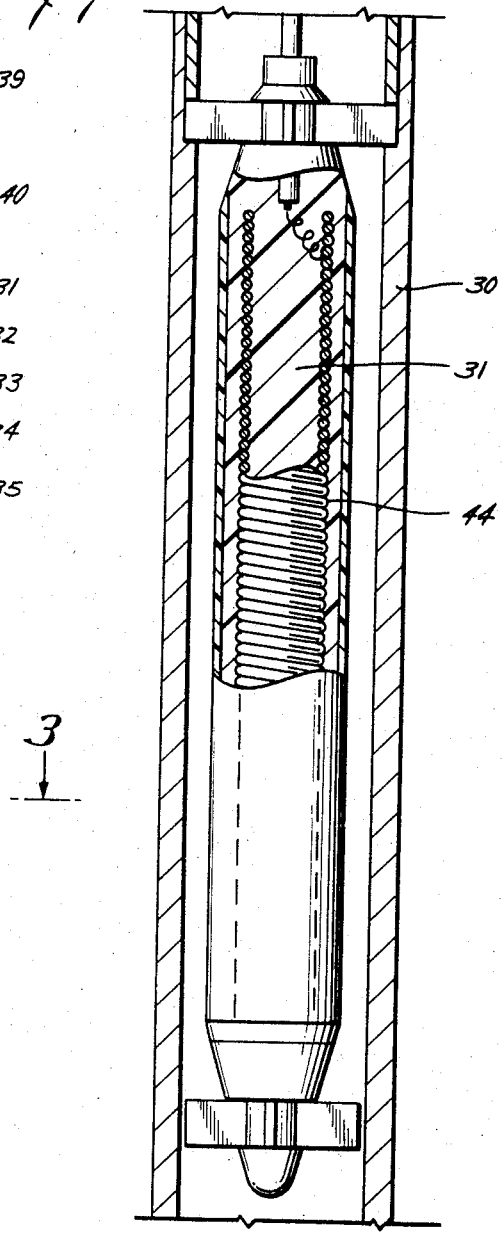
Jean Louis Tocanne
INVENTOR.
BY Richard E. Bee
ATTORNEY

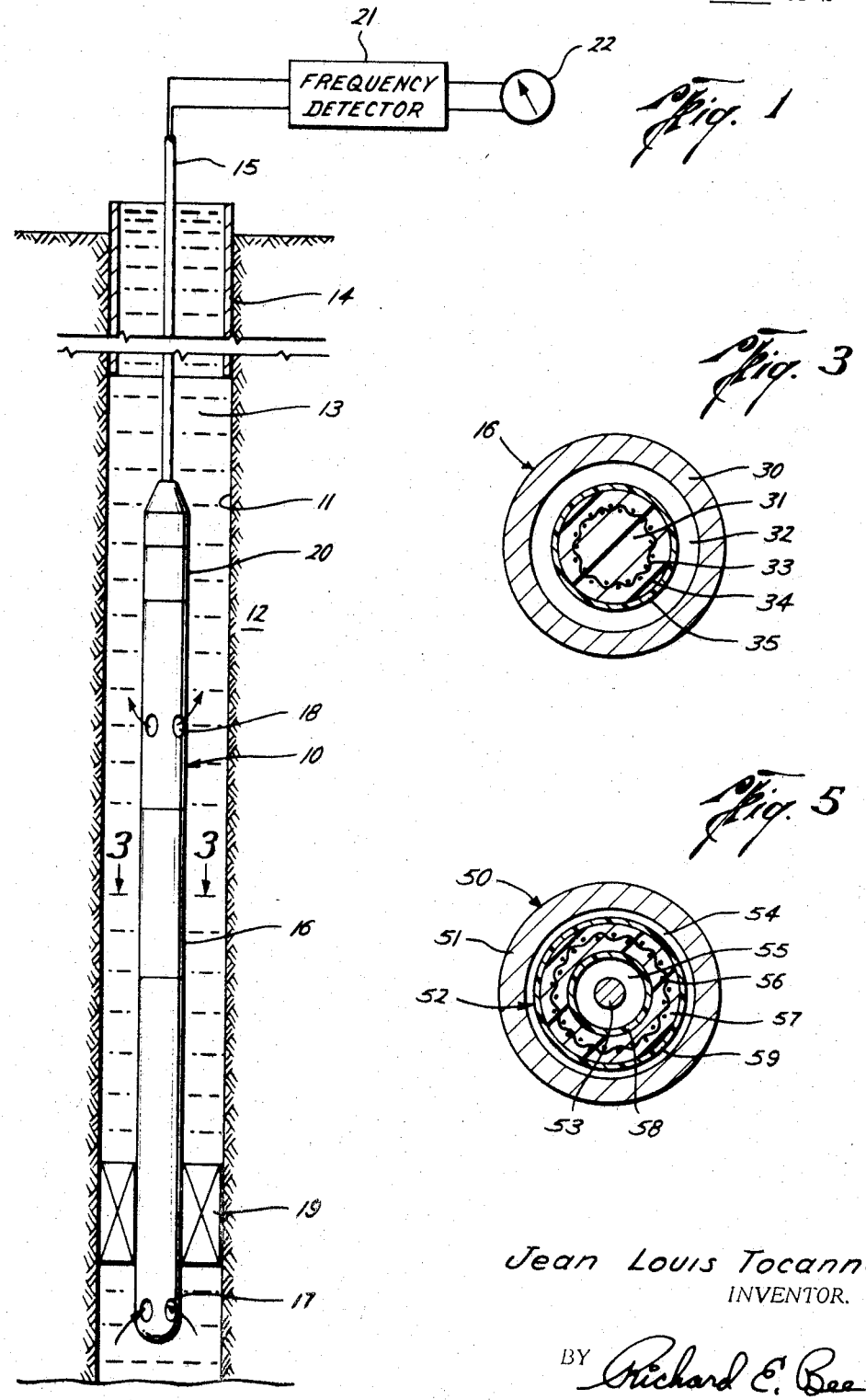

United States Patent Office 3,437,924
Patented Apr. 8, 1969

3,437,924
FLUID ANALYZER PROBE INCLUDING THIN PLIABLE METAL ELECTRODE
Jean Louis Tocanne, Lozere-sur-Yvette, France, assignor to Societe de Prospection Electrique Schlumberger, S.A., Paris, France, a French corporation
Filed Nov. 30, 1965, Ser. No. 510,620
Claims priority, application France, Dec. 17, 1964, 999,046
Int. Cl. G01r 27/26; G01v 3/18
U.S. Cl. 324—61
9 Claims

ABSTRACT OF THE DISCLOSURE

Disclosed is a novel electrode structure for use in a fluid analyzer device to be utilized for in situ analysis of the production fluid in producing oil wells. This electrode structure utilizes an outer metal tubular housing as one electrode of a capacitor together with a thin pliable metal inner electrode embedded in an electrical insulator forming a structural support member and protective housing for said inner electrode. The inner electrode assembly is capable of thermal expansion and contraction without adverse deterioration effects.

---

This invention relates to apparatus for analyzing fluid mixtures and, particularly, to capacitor cell apparatus for determining the amount of water in fluid mixtures in earth boreholes.

In the petroleum industry, the recovery of oil and other hydrocarbon fluids from the subsurface earth formations can frequently be improved if knowledge is available concerning the water content at different points along the intended producing zone of the oil well. For this reason, it has been heretofore proposed to use capacitor cells which are lowered into the oil well borehole for purposes of measuring the oil-to-water ratio of the subsurface fluids along the producing zone.

A particularly suitable form of capacitor cell for this purpose is described in applicant's copending U.S. patent application Ser. No. 254,247, filed on Jan. 28, 1963 now issued as United States Patent No. 3,279,249. The capacitor cell apparatus described in this copending patent application provides improved measurements of oil-water ratios by using a form of construction whereby at least one of each pair of electrodes between which the fluid mixture is allowed to flow is covered with a layer of electrical insulation material having a thickness of approximately the same magnitude as the thickness of the remaining interelectrode space through which the fluid mixture is flowing.

It has been found, however, that difficulties are encountered with this form of construction when the capacitor cell is exposed to high temperatures and pressures. Such conditions are encountered in the lower regions of deep oil wells since both temperature and pressure increase with depth. In particular, it has been found that the layer of electrical insulation material in such capacitor cells tends to loosen and crack when repeatedly exposed to such high temperatures and pressures. This has been found to be caused principally by differences in the thermal expansion of the insulation material and the metal electrode material to which it is attached. The problem is aggravated by the presence of high static pressures.

It is an object of the invention, therefore, to provide new and improved apparatus for analyzing fluid mixtures which is capable of operating under widely varying conditions of temperature and pressure.

It is another object of the invention to provide new and improved capacitor cell apparatus of relatively rugged construction for use under extreme environmental conditions.

It is a further object of the invention to provide new and improved capacitor cell apparatus for analyzing fluid mixtures in an environment of relatively high temperatures and pressures.

In accordance with the invention, an apparatus for analyzing fluid mixtures comprises a pair of electrodes adapted to receive therebetween the fluid mixture to be tested. At least one of these electrodes is made to be a flexible electrode formed by a thin, readily deformable layer of metal material. The apparatus then includes electrical insulation material located on the flexible electrode and covering the surface portion thereof which is exposed to the fluid mixture.

For a better understanding of the present invention, together with other and further objects and features thereof, reference is had to the following description taken in connection with the accompanying drawings, the scope of the invention being pointed out in the appended claims.

Referring to the drawings:

FIG. 1 shows the use of apparatus constructed in accordance with the present invention for analyzing fluid mixtures in an oil well borehole;

FIG. 2 is an enlarged elevational cross-sectional view of the capacitor cell portion of the FIG. 1 apparatus;

FIG. 3 is a horizontal cross-sectional view taken along the section line 3—3 of FIG. 2;

FIG. 4 is an elevational cross-sectional view of a modified form of capacitor cell constructed in accordance with the present invention; and FIG. 5 is a horizontal cross-sectional view of a further modified form of the capacitor cell of the present invention.

Referring to FIGURE 1 of the drawings, there is shown an instrument 10 adapted for movement through an oil well borehole 11 drilled into subsurface earth formations 12. The borehole 11 is filled with the fluid mixture 13 which is being produced from the earth formations. The upper portion of the borehole 11, above the producing zone, is lined with casing pipe 14. Instrument 10 is moved through the borehole 11 by means of an armored multi-conductor cable 15 which extends to the surface of the earth.

The borehole instrument 10 includes capacitor cell apparatus 16 having internal fluid passageways through which the borehole fluid 13 may pass. To this end, the instrument 10 includes lower ports 17 through which the fluid 13 may enter the instrument 10 and upper ports 18 through which the fluid may leave the instrument 10. A flexible or inflatable packer member 19 is mounted on the exterior of the instrument 10 intermediate the ports 17 and 18 for preventing the fluid 13 from flowing past the instrument 10 without passing through the interior of the capacitor cell 16. It is assumed that the oil well being considered is a producing well and that the borehole fluid 13 is flowing in an upwardly direction.

The instrument 10 also includes, in a fluid-tight compartment therein, a frequency-modulation oscillator circuit 20 which is connected to the capacitor cell 16 and to a pair of the conductors contained in the cable 15. The capacitor cell 16 is connected into the frequency-determining circuit of the oscillator 20 to control the frequency of oscillation thereof. The output terminals of the oscillator 20 are connected to the cable conductors for supplying the oscillator signal to a frequency detector 21 located at the surface of the earth. Detector 21 provides a direct-current type output signal which is proportional to the received frequency. This signal is supplied to a metering device 22, which may take the form of a recording galvanometer, for providing an indication of the magnitude thereof.

The indication provided by meter 22 is dependent on the capacitance of the capacitor cell 16 which, in turn is dependent on the effective dielectric constant of the fluid mixture passing through the capacitor cell 16. It can be shown that this capacitance value varies as a direct function of the percentage or fractional amount of water which is contained in the fluid mixture passing through the capacitor cell 16, the capacitance increasing as the percentage of water increases. With the present apparatus, the relationship is nearly linear for water percentages of about 30% or less.

Referring now to FIGURES 2 and 3 of the drawings, there is shown in a cross-sectional manner the details of the capacitor cell 16 of FIG. 1. The capacitor cell 16 includes an outer elongated metal tubular member 30 forming one of the electrodes of the cell. Tubular member 30 also serves as the outer wall of the instrument 10 over the interval occupied by the capacitor cell 16. The capacitor cell 16 also includes an inner elongated cylindrical support member 31 composed of electrically nonconductive material. Support member 31 is coaxially positioned within the tubular member 30 to provide a cylindrical fluid passageway 32 between the support member 31 and the inner wall of the tubular member 30.

The capacitor cell 16 also includes a thin, flexible layer of metal material 33 secured to the support member 31 and forming a second electrode of the capacitor cell 16. In the present embodiment, this flexible layer 33 is formed by a layer of metal braid material which surrounds the support member 31 so as to form a cylindrical electrode structure. The capacitor cell 16 includes additional electrical insulation material 34 covering the layer of metal material 33 and electrically insulating such layer 33 from the fluid passageway 32. The layer 34 is covered with a thin outer layer 35 of non-wettable electrical insulation material.

In order to provide improved measurements, the total thickness of insulation material exterior to the flexible electrode formed by the metal braid material 33 is made approximately equal to the thickness of the remainder of the space which is used to provide the fluid passageway 32.

Members or layers 31, 34 and 35 are preferably composed of synthetic resin plastic material. In particular, it has been found advantageous to use for the members 31 and 34 an epoxy resin and for the layer 35 a fluorocarbon resin such as polytetrafluoroethylene. The use of epoxy resin provides desirable mechanical strength characteristics, while the fluorocarbon resin provides desirable non-wetting characteristics such that a film of water will not build up on the surface thereof.

In a preferred manner of construction, the metal braid material 33 forming the flexible electrode is embedded in a solid block of epoxy resin by molding or casting the epoxy resin about the metal braid material. In this case, the support member 31 and the layer 34 correspond to the inner and outer portions of a single solid structure.

The support member 31 and attached structures are properly positioned within the outer tubular member 30 by means of a pair of spacer members 36 and 37 in the form of centering spiders. The upper centering spider 36 is attached to the top end of the support member 31 and is secured to the inner wall of the tubular member 30 in a non-movable manner. The lower centering spider 37 is attached to the lower end of the support member 31 but is adapted to slide up and down in a longitudinal direction within the tubular member 30.

Electrical connection to the flexible inner electrode 33 is provided by means of a coaxial cable 38 which passes through a cylindrical metal anchoring head 39 and into the upper end of the plastic support member 31. Anchoring head 39 is embedded into the support member 31 and layer 34, preferably at the time of the casting of these plastic materials. The outer metal shield of the coaxial cable 38 is welded to the anchoring head 39. Cable 38 is of the high pressure type. The lower end of the center conductor of the coaxial cable 38 is connected to the flexible metal braid electrode 33 by means of a flexible connecting wire 40 which is embedded in the support member 31 and is welded to both the center conductor and the metal braid electrode. All in all, the foregoing construction provides a highly pressure-resistant, fluid-tight type of electrical connection.

When the capacitor cell 16 is lowered into the borehole 11 for purposes of measuring the water content or oil-water ratio of the fluid mixture 13, there is no deterioration of the electrode structures by reason of the borehole temperatures and pressures, even though both factors may be relatively high. At high temperatures, longitudinal thermal expansion of the inner support member 31 is readily accommodated by the sliding action of the lower centering spider 37. Also, since the metal braid material 33 is flexible and of a yielding nature, the plastic support member 31 and the plastic layers 34 and 35 may readily expand in either a radial or longitudinal direction without producing any appreciable stresses in these members because of contact with members such as braid material 33 having different thermal coefficients of expansion. In other words, as a practical matter the entire center structure formed by members 31, 33, 34 and 35 behaves as a unitary block of which the thermal expansion is uniform.

Referring now to FIGURE 4 of the drawings, there is shown a modified form of construction for the capacitor cell 16. The FIG. 4 embodiment is identical to the FIG. 2 embodiment except that the flexible inner electrode of the capacitor cell 16 is formed by a helical coil of wire 44 which is wound around the plastic support member 31.

As further embodiments, the flexible inner electrode may instead be formed by a layer of wire mesh material or by a layer of interlaced metal filaments or other thread-like wire elements. In some cases, the flexible inner electrode may instead take the form of a thin metal film secured to the support member 31. In each case, the inner electrode is coated or covered with an outer layer of electrical insulation material. The primary criteria is that the flexible inner electrode should be of a readily yieldable construction to allow for thermal expansion without producing any appreciable stresses in the plastic materials.

Referring now to FIGURE 5 of the drawings, there is shown a horizontal cross-sectional view of yet another embodiment of the capacitor cell of the present invention. In this embodiment, a capacitor cell 50 is provided by an outer metal tubular member 51, an intermediate composite tubular member 52 and a center metal member 53. Each of these members 51, 52 and 53 is of an elongated cylindrical construction and the various members are mounted in a coaxial manner with respect to one another. There is thus provided a pair of cylindrical fluid passageways 54 and 55.

The composite intermediate member 52 includes a flexible electrode 56 formed by a cylinder of metal braid material which is embedded in a cylindrical tube of plastic material 57 such as epoxy resin. The inner and outer surfaces of the tube 57 are coated or covered with layers of plastic material 58 and 59 of a highly non-wettable nature, such as a fluorocarbon resin.

In operation, the center metal member 53 and the outer metal member 51 are electrically connected with one another so as to constitute a first set of electrode structures. The flexible electrode 56 constitutes a second set of electrode structure. The electrical capacitance between these first and second sets of electrode structures provides a measurement of the water content of the fluid mixture passing through the fluid passageways 54 and 55. The construction of this embodiment increases the cross-sectional area which is available for the flow of the fluid mixture. Also, since, in effect, two capacitor cells are provided which are connected in parallel with one another, the capacitance of the capacitor cell is increased by a factor of approximately two.

What is claimed is:

1. Apparatus for analyzing fluid mixtures in a well bore comprising: a body member sized for passage through a well bore, said body member having a longitudinally extending annular passage for flow of fluid therethrough, said passage having a longitudinal section defined by inner and outer concentrically arranged cylindrical electrodes forming a capacitive cell, said inner electrode formed by a thin pliable metal wall construction capable of deformation, and said inner electrode being embedded within an electrical insulation material forming a support for said electrode and a covering to prevent exposure of the electrode to fluid mixtures, whereby said electrical insulation may expand or contract in dependence upon temperature and pressure and said electrode will follow such movements as a unitary part of said electrical insulation.

2. The apparatus of claim 1 wherein said inner electrode comprises a yieldable thin metal film.

3. The apparatus of claim 1 wherein said inner electrode comprises a thin wall of interlaced metal filaments.

4. The apparatus of claim 1 wherein said inner electrode comprises a helical coil of thin wire.

5. The apparatus of claim 1 wherein said inner electrode comprises a spiral of thin wire-like metal material.

6. Apparatus for analyzing fluid mixtures in a well bore comprising: a body member sized for passage through a well bore, said body member having a longitudinally extending annular passage for flow of fluid therethrough, said passage having a longitudinal section defined by inner and outer concentrically arranged cylindrical electrodes forming a capacitive cell, said inner electrode being formed by a thin pliable layer of metal braid material capable of expansion, and said inner electrode being embedded within an electrical insulation material forming a support for said electrode and a covering to prevent exposure of the electrode to fluid mixtures, and plural support members for mounting said inner electrode assembly, one of said support members being rigidly secured to said outer cylindrical electrode, the other support member being adapted to slide in a longitudinal direction within said outer cylindrical electrode, whereby said electrical insulation may expand or contract in dependence upon temperature and pressure and said electrode will follow such movements as a unitary part of said electrical insulation.

7. The apparatus of claim 6 wherein said inner electrode is formed by a layer of wire mesh material.

8. The apparatus of claim 6 wherein said inner electrode is formed of thread-like wire elements.

9. The apparatus of claim 6 and further including electrical circuit means coupled to said inner and outer electrodes for providing an indication of the electrical capacitance therebetween.

References Cited

UNITED STATES PATENTS

| 2,599,583 | 6/1952 | Robinson et al. | 324—61 |
| 2,752,543 | 6/1956 | Smith | 317—246 |
| 2,976,720 | 3/1961 | Callahan | 324—61 X |
| 3,093,793 | 6/1963 | Hicken | 324—54 |
| 3,148,314 | 9/1964 | Ponemon | 317—246 |
| 3,190,122 | 6/1965 | Edwards. | |
| 3,238,452 | 3/1966 | Schmitt et al. | 324—61 |
| 3,279,249 | 10/1966 | Tocanne | 324—61 |

RUDOLPH V. ROLINEC, *Primary Examiner.*

E. E. KUBASIEWICZ, *Assistant Examiner.*

U.S. Cl. X.R.

73—398; 317—246; 324—10, 11